United States Patent [19]
Yadid-Pecht et al.

[11] Patent Number: 6,115,065
[45] Date of Patent: *Sep. 5, 2000

[54] IMAGE SENSOR PRODUCING AT LEAST TWO INTEGRATION TIMES FROM EACH SENSING PIXEL

[75] Inventors: Orly Yadid-Pecht, Arcadia; Eric R. Fossum, La Crescenta, both of Calif.

[73] Assignee: California Institute of Technology, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/744,494

[22] Filed: Nov. 7, 1996

Related U.S. Application Data

[60] Provisional application No. 60/006,260, Nov. 7, 1995.

[51] Int. Cl.$^7$ ................. H04N 3/14; G03B 7/00
[52] U.S. Cl. ............................. 348/308; 348/362
[58] Field of Search ................... 348/294, 296, 348/308, 321, 367, 269, 362, 298

[56] References Cited

U.S. PATENT DOCUMENTS

| | | | |
|---|---|---|---|
| 4,589,024 | 5/1986 | Koch et al. | 348/297 |
| 4,626,916 | 12/1986 | Mizoguchi et al. | 348/307 |
| 4,706,123 | 11/1987 | Chautemps | 358/213.19 |
| 4,819,070 | 4/1989 | Hynecek | 358/213.11 |
| 4,821,103 | 4/1989 | Busby | 348/298 |
| 4,884,142 | 11/1989 | Suzuki | 358/213.19 |
| 4,959,723 | 9/1990 | Hashimoto | 358/213.11 |
| 5,084,704 | 1/1992 | Parrish | 341/164 |
| 5,162,914 | 11/1992 | Takahashi et al. | 358/213.19 |
| 5,262,871 | 11/1993 | Wilder et al. | 348/308 |
| 5,264,944 | 11/1993 | Takemura | 358/335 |
| 5,274,459 | 12/1993 | Masaharu . | |
| 5,434,619 | 7/1995 | Yonemoto | 348/308 |
| 5,471,515 | 11/1995 | Fossum et al. | 377/60 |
| 5,485,206 | 1/1996 | Eigo et al. . | |
| 5,541,402 | 7/1996 | Ackland et al. | 250/208 |
| 5,541,654 | 7/1996 | Roberts | 348/301 |
| 5,576,763 | 11/1996 | Ackland | 348/308 |
| 5,585,847 | 12/1996 | Sayag | 348/269 |

FOREIGN PATENT DOCUMENTS

| | | |
|---|---|---|
| 0300365 | 1/1989 | European Pat. Off. . |
| 0599570 | 6/1994 | European Pat. Off. . |

OTHER PUBLICATIONS

Hyomasu, M. A New MOS Imager Using Photodiode as Current Source, IEEE Journal of Solid–State Circuits, vol. 26, No. 8, Aug. 1991.

Fossum et al. Application of the Active Pixel Sensor Concept to Guidance and Navigation, SPIE, vol. 1949 paper 30 (1993).

Mendis et al., CMOS Active Pixel Image Sensor, IEEE Transactions on Electrons Devices, 41(3) 452–453.

Mendis et al., Progress in CMOS Active Pixel Image Sensors, SPIE vol. 2172:1–11 (1994).

*Primary Examiner*—Wendy Garber
*Assistant Examiner*—Alicia M. Harrington
*Attorney, Agent, or Firm*—Fish & Richardson P.C.

[57] ABSTRACT

Designs and operational methods to increase the dynamic range of image sensors and APS devices in particular by achieving more than one integration times for each pixel thereof. An APS system with more than one column-parallel signal chains for readout are described for maintaining a high frame rate in readout. Each active pixel is sampled for multiple times during a single frame readout, thus resulting in multiple integration times. The operation methods can also be used to obtain multiple integration times for each pixel with an APS design having a single column-parallel signal chain for readout. Furthermore, analog-to-digital conversion of high speed and high resolution can be implemented.

23 Claims, 5 Drawing Sheets

IMAGE SENSOR PRODUCING AT LEAST TWO INTEGRATION TIMES FROM EACH SENSING PIXEL

This application claims the benefit of the U.S. Provisional Application Ser. No. 60/006,260, filed on Nov. 7, 1995.

ORIGIN OF THE INVENTION

The invention described herein was made in the performance of work under a NASA contract and is subject to the provisions of Public Law 96-517(35 USC 202) in which the Contractor has elected to retain title.

FIELD OF THE INVENTION

The present invention relates to semiconductor image sensor, and more specifically, to a system and method of extending dynamic range in CMOS active pixel sensor circuits.

BACKGROUND AND SUMMARY OF THE INVENTION

An active pixel sensor ("APS") is a special kind of light sensing device. Each active pixel includes a light sensing element and one or more active transistors within the pixel itself. The active transistors amplify and buffer the signals generated by the light sensing elements in the pixels. One type of such APS devices is disclosed in U.S. Pat. No. 5,471,515 by Fossum et al., the disclosure of which is incorporated herein by reference.

APS devices represent an emerging technology in a wide range of imaging applications. APS has a number of significant advantages in comparison with the well-developed and widely used charge coupled devices (CCDs). Because of the number of stages in a CCD, a nearly perfect charge transfer efficiency must be maintained in a CCD in order to maintain good signal fidelity. This usually makes CCDs susceptible to damage from both ionizing and displacement damage. In particular, the displacement damage caused by high-energy particles and photons may prove to be deadly to CCDs.

Large CCD arrays present engineering difficulties in manufacturing. Device miniaturization is difficult with CCD devices since the extreme requirements of CCDs necessitate a special formation process. This formation process prevents CCDs from being easily integrated with on-chip integrated circuits such as complementary-metal-oxide-semiconductor (CMOS) integrated circuits. CCDs also suffers limited spectral responsivity range and readout rates. Furthermore, the readout of CCDs is destructive, i.e., their stored value is destroyed upon reading out. Implementation of the nondestructive readout in a CCD device is difficult.

In contrast, an APS device receives and processes input signals with the active pixel itself, thus eliminating the charge transfer over distances that are inherent in CCDs. Consequently, many drawbacks associated with CCDs are avoided in APS devices. For example, the performance of APS devices can be maintained as the array size increases. The APS readout rate is usually higher than that of CCDs. Since CMOS circuitry is often associated with the image sensor, the power consumption can be significantly reduced. APS devices are inherently compatible with CMOS processes, allowing reduced cost of manufacturing. Many on-chip operations and controls can be relatively easily implemented including timing and analog-to-digital conversion. APS devices are also less vulnerable to radiation damage and can be designed for non-destructive readout. Moreover, the active pixels of APS devices allow random access and on-chip signal processing.

One important benchmark in performance of imaging devices is the ratio of the saturation level of the detectors and the noise level thereof or the signal-to-noise ratio (SNR). This can be expressed in terms of dynamic range of the device. The dynamic range is usually expressed in dB by 20 log(SNR) or in binary (bits) by $\log_2$ (SNR). The larger the dynamic range, the better an imaging devices.

In particular, a large dynamic range is desirable in applications for sensing low light signals and capturing images with large variations in brightness.

The dynamic range of previously-reported CMOS-based APS circuits has been limited by both the saturation level of the signal chain circuit, which is typically about 1.2 volts for a 5-volt power supply, and the noise floor of the sensor, which is typically about 150 $\mu$V. This results in a dynamic range of approximately 78 dB (13 bits), which is comparable to the dynamic range of the state-of-art CCD devices.

The output voltage signal of an imaging device is dependent on the input light level, the efficiency of the optical coupling device and the detector characteristics including the quantum efficiency, the effective active sensing area, the integration time, and the electrical conversion gain of volts/electron. The output signal can be approximately expressed as the following:

$$V_{out} \approx \frac{\Phi}{4f^2} \tau_{optics} A_{det} T_{int} \eta G, \qquad (1)$$

where $\Phi$ is the incident photon flux, f is the f-stop of the coupling optical system, $\tau_{optics}$ is the transmission of the optical system, $A_{det}$ is the pixel size, $T_{int}$ is the integration time, $\eta$ is the pixel quantum efficiency, and G is the conversion gain in volts/electron. The typical values for a APS device are f/8, 80% for $\tau_{optics}$, 20 $\mu$m for $A_{det}$, 33 ms for $T_{int}$, 25% in $\eta$, and G=10 $\mu$V/e$^-$, respectively.

The exposure of an imaging device for a given hardware configuration is usually controlled by changing either the aperture (i.e., f-stop) or the integration time. If the input light level is low, the integration time can be increased to improve the signal-to-noise ratio. If the input light is bright, the integration time is reduced to avoid saturation of the detector while maintaining a high SNR. The lower limit of the integration time is set by the readout time.

A number of prior-art techniques exist for controlling the integration time. For example, the integration time of a CMOS APS device with N rows of pixels can be controlled by resetting a row of pixels in advance of readout. If the readout time for one row of pixels is $T_{row}$, the total frame readout time is $NT_{row}$. Since the pixels of a row are reset for a new integration upon readout, the integration time is simply the frame time $NT_{row}$.

FIG. 1 illustrates an exemplary APS. A pixel array 102 has N rows of pixels with each row having M columns. A column-parallel signal chain 104 such as a sampling capacitor bank with M storage cells is used for readout.

In a specific operation of readout, a particular row is selected for readout at one time. The sensor data from the M pixels in the selected row is copied onto the capacitor bank 104. The copy process also resets the pixels in the selected row and begins a new integration. The M storage cells in the capacitor bank 104 is then scanned sequentially for readout. The above readout process is then repeated for the next row.

Therefore, the integration time for each pixel is identical and is equal to the readout time of a frame, i.e., $NT_{row}$.

Another prior-art approach uses an electronic switching mechanism built in the pixel design of a CMOS APS device, allowing electronic shuttering and simultaneous integration. This was disclosed in U. S. Provisional Application No. 60/010,305 filed on Jan. 22, 1996 by Fossum et al.

The inventors of the present invention recognized a limitation of the above two methods in that the exposure remains the same for the entire image. This can result in distortion of the detected images in some circumstances. For example, an outdoor scene might be optimally exposed for the sunlit areas but overexposed in the shadowed areas. This can result in loss of detail in shadowed areas.

One solution to the above problem is to use a nonlinear output sensor. Such a sensor is designed to have a high differential gain for light levels, and low differential gain for high light levels. It is desirable that the nonlinear gain be achieved within each pixel. As a result, pixel to pixel variations in the transfer function can lead to unacceptable values of fixed pattern noise.

Another approach is to implement multiple storage sites in each pixel in CCD devices to record different integration signals from the same pixel. In case of two storage sites in each pixel, one storage site corresponds to a short integration period and the second to a long integration period, thus increasing the dynamic range. The readout data can be transformed to a lower bit count encoding using nonlinear techniques for display, storage, and transmission. One limitation of this technique is a decreased readout rate since the readout time may be doubled since twice as much of the amount of data may need to be read. Another limitation is the reduced fill factor since two storage sites occupy considerable pixel area.

In view of the above limitations, the present invention describes a new technique in APS sensors and operation methods thereof to increase their dynamic ranges. According to the preferred embodiments of the present invention, at least two different integration times are obtained for each active pixel. One or more column-parallel signal chains are used to implement the multiple integration times for each active pixel. For an APS device with only one column-parallel signal chain for readout, each pixel is sampled multiple times during a single frame readout, thus resulting in multiple integration times.

Another aspect of the present invention increases the frame rate by using more than one column-parallel signal chain to achieve multiple data points of different integration times for each pixel. A maximal frame rate is achieved for a given APS device by having the number of column-parallel signal chains match the number of different integration times. A preferred operation mode of such system in accordance with the present invention includes simultaneously copying multiple columns into the column-parallel signal chains and subsequently reading out all the column-parallel signal chains simultaneously with each being scanned in a sequential manner. The frame rate is increased by a factor equal to the number of the column-parallel signal chains as compared with achieving the same number of integration times with a single column-parallel signal chain for readout. The dynamic range of the APS device is thus extended by a factor given by the ratio of the longest integration time versus the shortest integration time.

A new readout method is also described. This method can be used to improve the dynamic range of a conventional APS device having a single column-parallel signal chain by achieving multiple integration times for each active pixel. Special advantages are obtained when used with non-destructive readout of an APS device in achieving multiple integration times of each pixel.

Another aspect incorporates digital processors including analog-to-digital converters in the column-parallel signal chains.

On-chip buffer memory units and/or multiple source followers may be used for each pixel to further enhance the flexibility and performance of the systems in accordance with the present invention.

BRIEF DESCRIPTION OF THE DRAWING

These and other advantages of the present invention will become more apparent in the light of the following detailed description of preferred embodiments thereof, as illustrated in the accompanying drawings, in which.

DESCRIPTION OF THE PREFERRED EMBODIMENTS

The description of the preferred embodiments will use CMOS APS devices as an example for implementation. However, it should be understood that the method and design can also be implemented in other active pixel sensors, and may be usable in other image acquiring systems.

Design Architectures and Operation Modes

Figure 2:
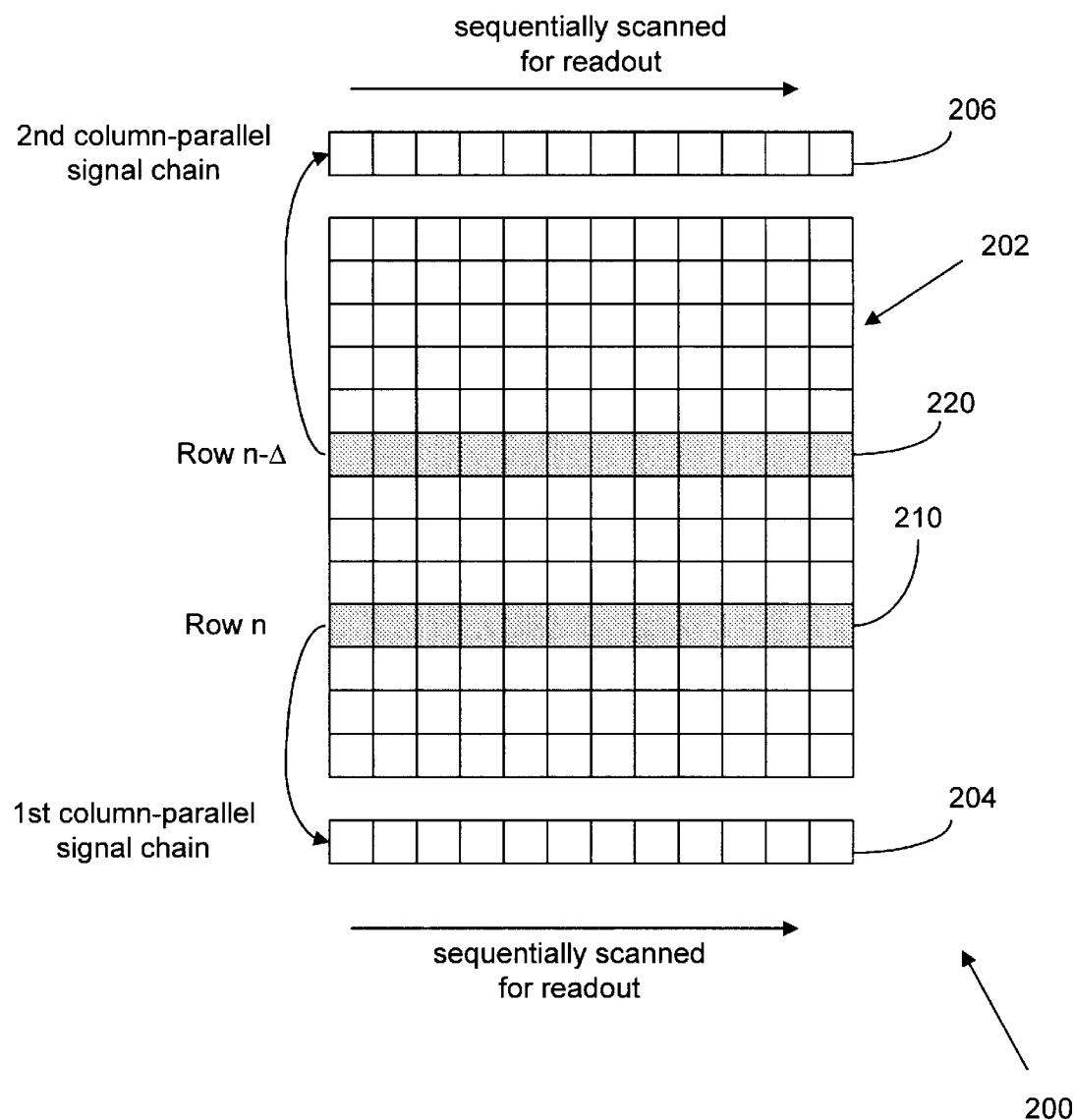
FIG. 2 shows an active pixel sensor with two column-parallel signal chains for readout in accordance with a preferred embodiment of the present invention.

FIG. 2 illustrates the first preferred embodiment 200 of the present invention. An active pixel array 202 has N rows and M columns, hence with a total of N×M pixels. Each pixel comprises a light sensing element and one or more active transistors. The active transistors amplify and buffer the signals generated by the light sensing element in the pixel. Each active pixel has one output source follower that is connected to the corresponding column bus. There are two column-parallel signal chains for readout. Each of the signal chains, 204 and 206, has M storage cells for temporarily storing the electrical signals from the pixels being read. The column-parallel signal chains 204 and 206 can be implemented with capacitor banks for analog processing and analog-to-digital converters (ADCs) for digital processing or any other device that is capable of storing image information.

The device 200 also includes an control circuit (not shown) having row and column decoders for addressing the proper row/column of pixels, clock generator circuits for synchronization, and readout circuits. The control circuit is operable to control the readout of the pixels and the operation of the column-parallel signal chain(s) in a desired sequence with desired integration time(s).

Figure 3:
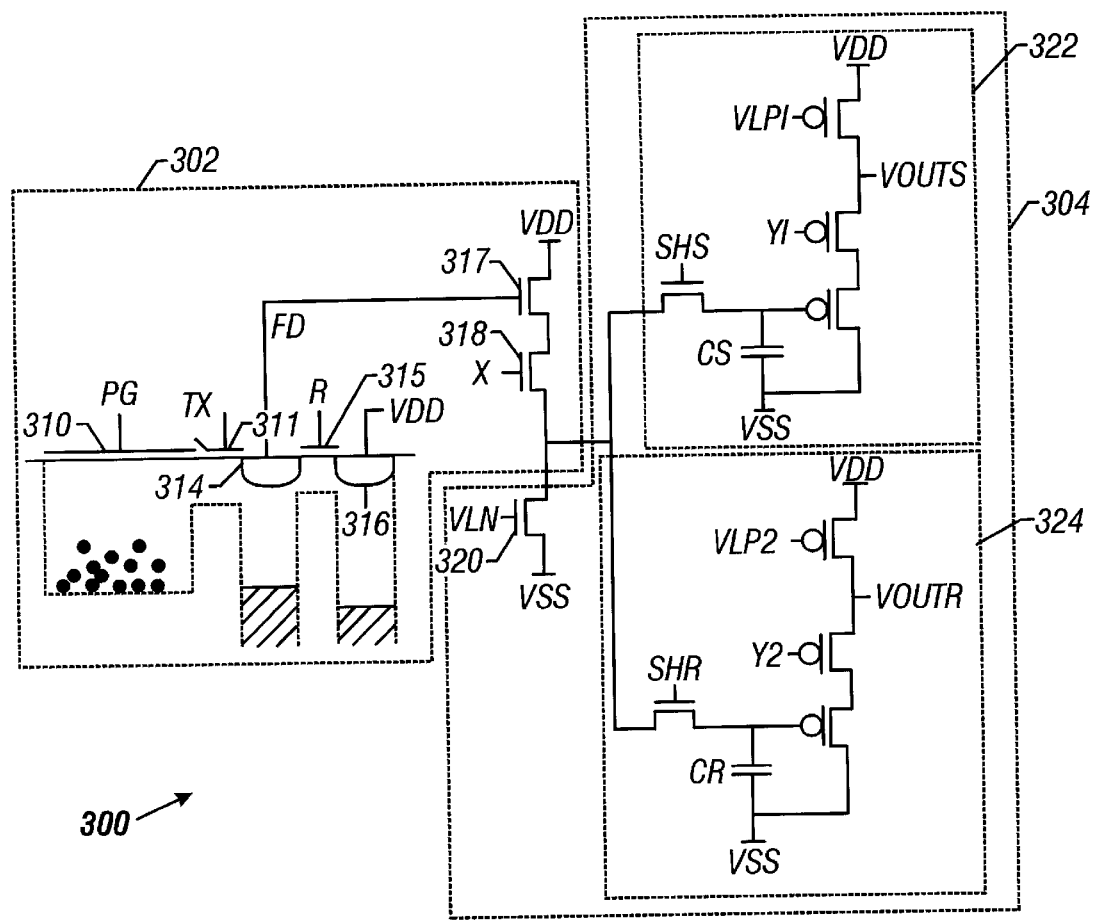
FIG. 3 shows one example of an active pixel structure and a cell for the column-parallel signal chain disclosed by the U.S. Pat. No. 5,471,515.

An example of such active pixel and the storage cell in a column-parallel signal chain is shown in FIG. 3. This is disclosed in the incorporated reference U.S. patent application Ser. No. 5,471,151 which describes an active pixel array with a single column-parallel signal chain for readout. FIG. 3 shows the active pixel 302 including a photogate 310, a DC biased transfer gate 311, an output floating diffusion 314, a reset transistor 315, a drain diffusion 316, a gate source follower 317, and a row selection transistor 318. The circuit 304 represents a storage cell shared by a column of active pixels. The storage cell 304 includes a load transistor 320, a first output circuit 321 for buffering and exporting the reset level, and a second output circuit 322 for buffering and exporting the signal level. In the architecture shown in FIG. 2, each active pixel of a column is connected to two such storage cells substantially similar to 304. It should be understood that other designs of the active pixel and column storage cell can also be used in accordance with the present invention.

In operation, a row of pixels in the active pixel array 202, e.g., the row n 210, is first selected for readout. The signals representing the M pixels of the row n 210 are copied simultaneously to the corresponding M storage cells in the first column-parallel signal chain 204. The time duration of the copying process is $T_{copy}$, typically about 1–10 µs for an APS device. The copying process also resets the pixels in the row n 210 and a new integration in the row n 210 is started. Secondly, the signals of M pixels in another row 220 that is shifted by Δ rows relative to row 210, i.e., the row (n–Δ), are simultaneously copied to the corresponding M storage cells in the second column-parallel signal chain 206 during time $T_{copy}$, and the pixels in the row (n–Δ) 220 are subsequently reset for another integration. The M storage cells in each of the first column-parallel signal chain 204 and the second column-parallel signal chain 206 are simultaneously and respectively scanned for readout. The M storage cells in each column-parallel signal chain is sequentially scanned and the signals therein are read out. This completes the readout of the row n 210 and row (n–Δ) 220. The time for scanning and reading one pixel is $T_{scan}$, which is typically between 100 ns–10 µs. Then, the next two rows are selected for readout in the same fashion. Therefore, a single row readout process reads two separated rows of pixels.

The above readout process repeats until every row in the active pixel array 202 are read to complete a frame. This results in two sets of data from every active pixel in the array 202, one from the first column-parallel signal chain 204 and another one from the second column-parallel signal chain 206, respectively. The two sets of data have different integration times and the two data points for the same pixel are read out at different times by a time lag of the time for a row readout process multiplied by Δ.

Figure 1:
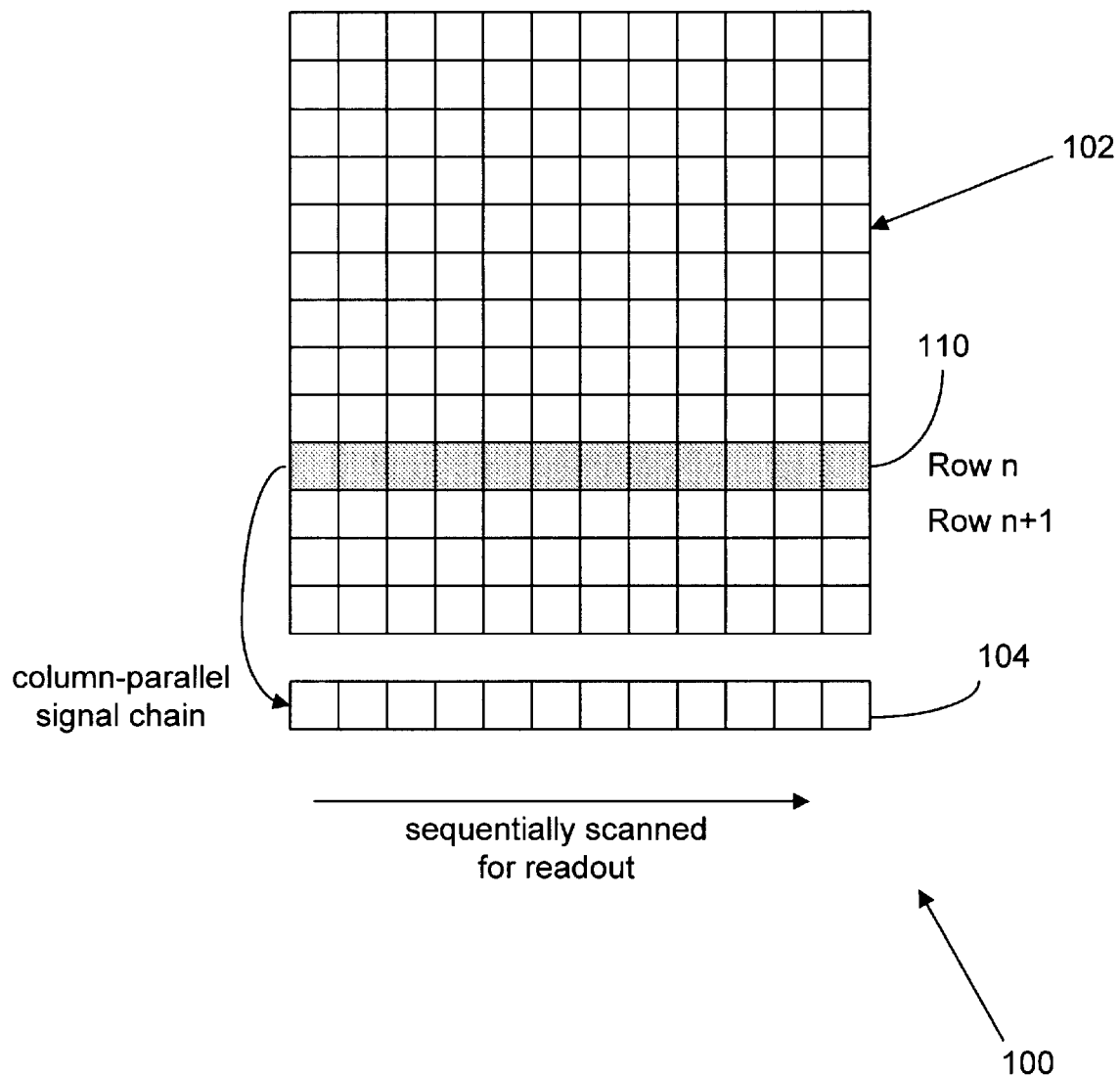
FIG. 1 illustrates an active pixel sensor with a single column-parallel signal chain to produce the same integration time for every pixel.

The time for a row readout is $$T_{row} = 2T_{copy} + MT_{scan}, \quad (2)$$

comparing to $(T_{copy}+MT_{scan})$ in a row readout in the prior-art system as in FIG. 1. The total readout time for a frame is given by:

$$T_{frame} = NT_{row}. \quad (3)$$

In the prior-art system of FIG. 1, the integration time for each pixel is the same and is the readout time for a frame. However, the two sets of readout from the two column-parallel signal chains 204 and 206 in the system of FIG. 2 have different integration times. The integration time for the signals copied into the first column-parallel signal chain 204 is given by:

$$T_{1int} = (N-\Delta)T_{row}, \quad (4)$$

and the integration time for the signals copied to the second column-parallel signal chain 206 is given by $$T_{2int} = \Delta T_{row}. \quad (5)$$

As a result, the dynamic range $D_2$ of the active pixel sensor 200 is improved over the dynamic range $D_1$ of the system 100 by a factor of $T_{1int}/T_{2int}$:

$$D_2(\text{dB}) = \log\left(\frac{T_{1int}}{T_{2int}}\right) + D_1(\text{dB}); \quad (6)$$

$$D_2(\text{bits}) = \log_2\left(\frac{T_{1int}}{T_{2int}}\right) + D_1(\text{bits}). \quad (7)$$

For example, when N=512 and Δ=2, then a 13-bit dynamic range is thus extended by 8 bits to 21 bits, or from 78 dB to 126 dB.

The detected image is reconstructed by reading out the bright portions of the image with the data of short integration time $T_{2int}$ from the second column-parallel signal chain 206. Conversely, darker portions of the image are read out using the data of long integration time $T_{1int}$ from the first column-parallel signal chain 204. Therefore, portions of a scene which appear saturated by the long integration time $T_{1int}$ can be managed by using the short integration time $T_{2int}$.

Figure 4:
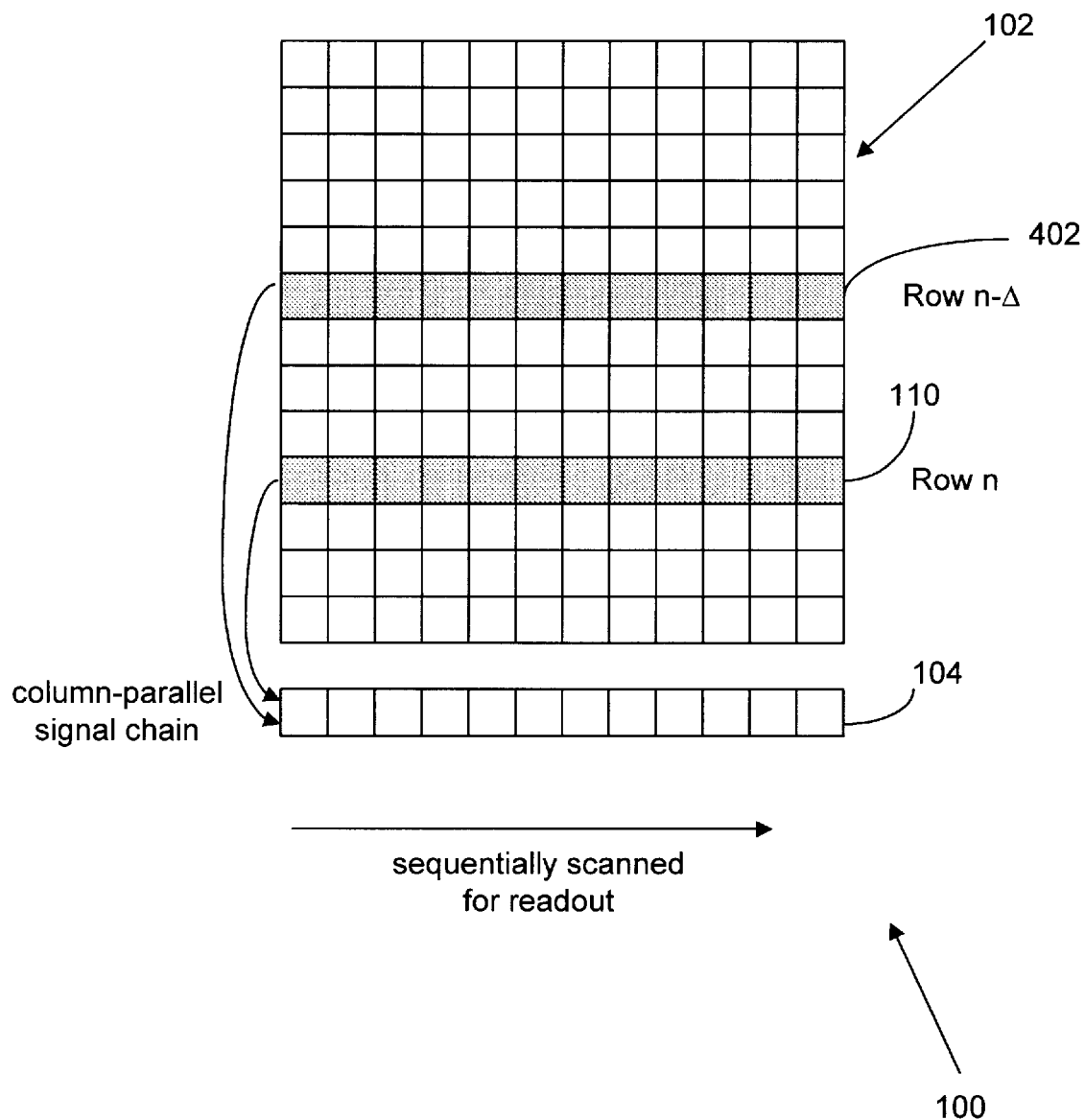
FIG. 4 shows a readout method for achieving multiple integration times using an active pixel sensor with a single column-parallel signal chain.

The second embodiment of the present invention uses the readout technique for the system 200 of FIG. 2 in the system 100 of FIG. 1 to extend the dynamic range. The readout sequence is illustrated in FIG. 4. The row n of pixels 110 in the active pixel array 102 is first selected for readout. The signals in the M pixels of the row n 110 are then copied simultaneously to the corresponding M storage cells in the column-parallel signal chain 104. The copying process also resets the pixels in the row n 110 and begins a new integration in the row n 110. Subsequently, the M storage cells of the column-parallel signal chain 104 is sequentially scanned and the signals therein are read out. Next, the signals of M pixels of another row(n–Δ) 402 are simultaneously copied to the corresponding M storage cells in the column-parallel signal chain 104. The row 402 is displaced from the row 110 by Δ number of rows. The pixels in the row (n–Δ) 402 are subsequently reset for another integration. Subsequently, the M storage cells of the column-parallel signal chain 104 is again sequentially scanned and the signals therein are read out. This completes one row readout process which takes a total time of $(2T_{copy}+2MT_{scan})=2T_{row}$.

The above process then repeats for row (n+1) and row (n–Δ+1), etc. until all N rows of active pixels in the array 102 are processed. The total frame readout time is $N(2T_{copy}+2MT_{scan})=2NT_{row}$, which is twice as long as the frame time in the prior-art readout shown in FIG. 1. However, two sets of data are obtained using the readout of FIG. 4, one set having a first integration time, $T_{1int}=(N-\Delta)2T_{row}$ and another set having a second integration time, $T_{1int}=\Delta 2T_{row}$. Two data points of different integration times from the same pixel are read out at two different times. The time lag between reading out the two data points is $\Delta(2T_{copy}+2MT_{scan})=2\Delta T_{row}$.

The increase in the dynamic range is essentially the same as in the first embodiment using a sensor design 200 of two column-parallel signal chains although the integration times are different. The second embodiment has an additional advantage of being compatible with previously-fabricated CMOS APS sensors with single column-parallel signal chain but has a reduced frame rate for readout due to the increased readout time per frame.

A third embodiment implements more than two integration times in an active pixel array. For a number of k integration times (k>1) for each active pixel, the respective integration times are $T_{1int}=k\Delta_1 T_{row}$, $T_{2int}=k\Delta_2 T_{row}, \ldots$, and $T_{kint}=k(N-\Delta_1-\Delta_2 \ldots -\Delta_{k-1})T_{row}$, if the architecture 100 of FIG. 1 is used in which there is only one column-parallel signal chain for readout. The respective readout time for a frame is $T_{frame}=NkT_{row}$. For example, N=585 and k=4, $\Delta_1$ may be chosen to be 1, $\Delta_2=8$, $\Delta_3=64$ so that $T_{1int}=1\times 4T_{row}$, $T_{2int}=8\times 4T_{row}$, $T_{3int}=64\times 4T_{row}$, and $T_{2int}=512\times 4T_{row}$.

In addition, k column-parallel signal chains can be implemented and used in a similar way as in the first embodiment 200. k rows of pixels are read out simultaneously and stored in the k column-parallel signal chains, respectively. The k column-parallel signal chains are subsequently scanned and read out simultaneously. Thus, the frame time is reduced by approximately a factor of k while achieving essentially similar dynamic range increase comparing to the use of a single column-parallel signal chain for k integration times.

Furthermore, an intermediate number of column-parallel signal chains between 1 and k can be used to produce a desired set of k integration times and a frame rate tailored for a specific application. At least one of the column-parallel chains is used to obtain at least two sets of data with different integration times.

The above embodiments contemplate using a destructive readout, wherein an active pixel is reset for another integration after the signal therein is copied and read out. One advantage of the destructive readout is that the on-chip correlated doubling sampling can be implemented in many active pixel sensors to suppress noise such as the fixed patten noise and the kTC noise. This is disclosed by Mendis et al. in "CMOS Active Pixel Image Sensor", IEEE Transactions On Electron Devices, Vol. 41(3), pp.452–453, March, 1994. A non-destructive readout can also be used with the above embodiments for an increased dynamic range and possibly increased speed. Each pixel continues to integrate the signal and the pixel value is copied and read out without resetting. One advantage of the non-destructive readout is that a fewer number of rows are needed than that in the destructive readout to achieve the same multiple integration periods. For example, non-destructive readout can be used to achieve four different integration times $T_{1int}=1\times 4T_{row}$, $T_{2int}=8\times 4T_{row}$, $T_{3int}=64\times 4T_{row}$, and $T_{2int}=512\times 4T_{row}$ using one column-parallel signal chain with 512 rows of pixels rather than 585 rows in the destructive readout. This can be done by choosing $\Delta_1=1$, $\Delta_2=7$, and $\Delta_3=56$ in a 512-row active pixel array.

Device Implementation (1) Choice of Pixel

The architectures of active pixel array for extended dynamic range previously described can be implemented with a number of possibilities. The preferred pixel design is a photogate CMOS APS shown in FIG. 3. However, many pixel designs of active-type and passive-type can be used. Examples of such include photodiode CMOS APS, a pinned photodiode CMOS APS, the passive pixel photodiode sensor, the charge modulation device active pixel sensor, and bipolar transistor-based pixels.

(2) Chip Layout

Figure 5:
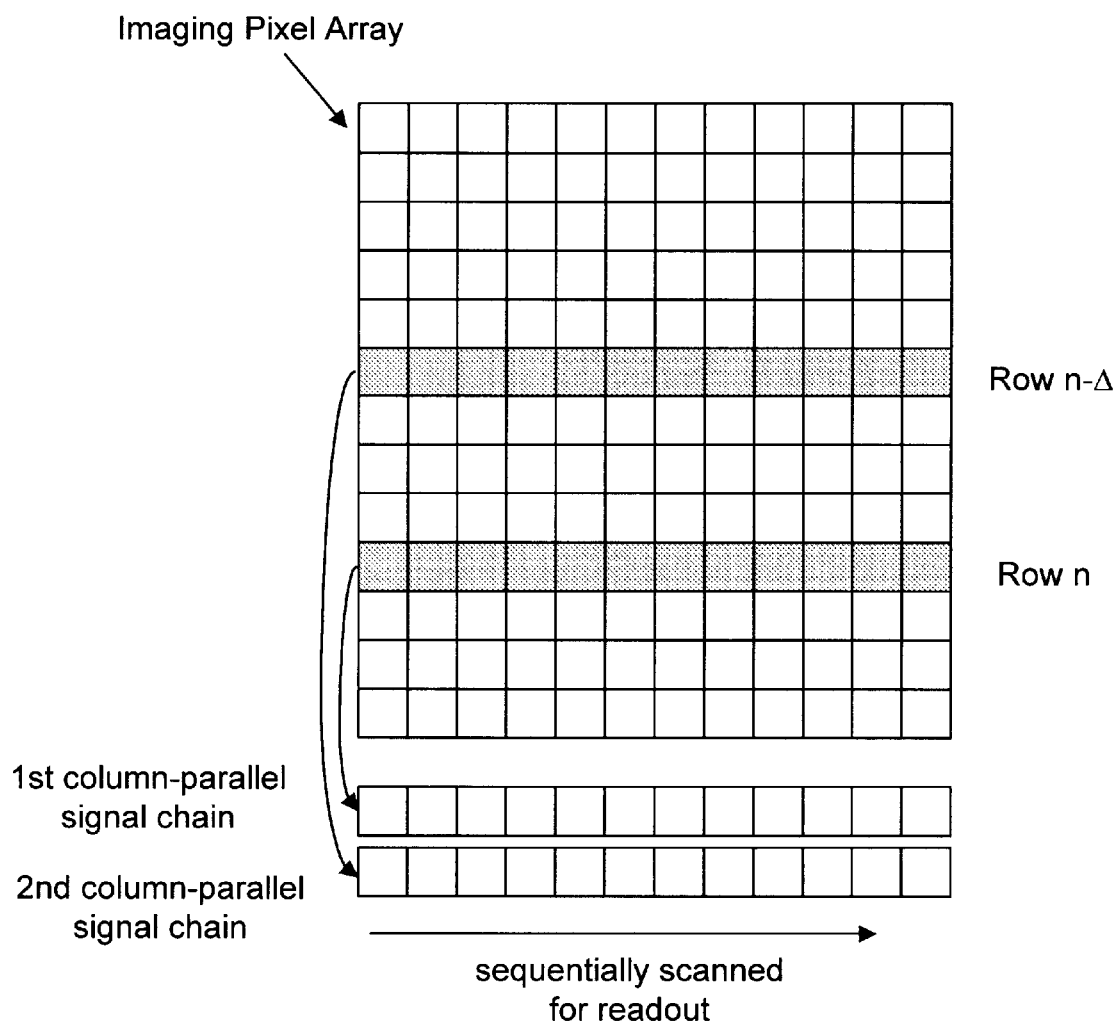
FIG. 5 shows another floor plan for positioning the two column-parallel signal chains relative to the active pixel array.

One or more column-parallel signal chains can use different elements in the pixels thereof including capacitors and analog-to-digital converters (ADCs). The physical floor plans of multiple column-parallel signal chains such as FIG. 2 and single column-parallel signal chain as in FIG. 1 can be varied as desired in practicing the present invention. For example, the second column-parallel signal chain 206 can be positioned with the first column-parallel signal chain 204 at the lower part of the active pixel array 202 as illustrated by FIG. 5.

(3) Multiple Outputs per Pixel

The inventors contemplate that a plurality of output source followers can be included in each pixel rather than one output source follower as described hereabove (e.g., FIG. 3). Each output source follower can be attached to a separate column bus and each column bus in turn can be attached to its own column parallel signal chain. This approach may provide greater flexibility in choosing the integration times.

(4) Pixel Synchronization

The above-described embodiments use multiple data points of different integration times from the same pixel which are read out at different times rather than simultaneously. If it is desired to synchronize the output of the two or more data points from the same pixel, an on-chip buffer memory is needed. The buffer memory holds the data from a pixel until all data points from that pixel are read out so that all the data points can be sent out simultaneously. In the case of the first embodiment 200 of FIG. 2, the buffer memory should be $\Delta$ rows in size and has a capacity of storing half of the data from an image in the worst case. If on-chip ADC is used, the output of the buffer memory can be the input to the ADC.

A High Performance Analog-to-Digital Converter ("ADC")

A high speed ADC with a high resolution can be made using the described techniques of the present invention. The multiple data points generated from each pixel can be converted from analog to digital with multiple ADCs with each data point being processed by one ADC. This can generate both a high resolution conversion by combining the bits from each data point and a fast conversion speed since the multiple ADCs operate in parallel.

For example, the architecture shown in FIG. 1 with a readout of four data points per pixel can be used for such a ADC. For illustration purpose, it is assumed that N=585, k=4, $\Delta_1=1$, $\Delta_2=8$, $\Delta_3=64$ so that $T_{1int}=1\times 4T_{row}$, $T_{2int}=8\times 4T_{row}$, $T_{3int}=64\times 4T_{row}$, and $T_{2int}=512\times 4T_{row}$. If each data point is converted using a 3-bit ADC, an ADC word length of 12 bits can be generated by patching the four outputs of the ADCs together. The time domain, which can be accurately controlled, is used to provide the effective gain of 8× between each of the four data points. This is shown in Table 1. Each of the four ADCs is shown as a single slope ADC, with an increment of 0.250 mV per step and a total of 8 levels. The time required for each conversion is 8 cycles. Since the four ADCs can be operated in parallel, the total time to achieve the 12-bit resolution could remain as 8 cycles. Typically, each cycle is of the order 1 µs so that a complete conversion can be finished in 8 µs. The bits from the four ADCs corresponding to four data points are reassembled externally to generate the 12-bit output.

TABLE 1

| | | | | |
|---|---|---|---|---|
| Integration Time ($T_{row}$) | 1 | 8 | 64 | 512 |
| Number or Steps | 8 | 8 | 8 | 8 |
| Actual volts per step | 0.250 mV | 0.250 mV | 0.250 mV | 0.250 mV |
| Effective volts per step | 128.00 mV | 16.000 mV | 2.000 mV | 0.250 mV |
| Full effective range | 1024.000 mV | 128.000 mV | 16.000 mV | 2.000 mV |

It is noted that achieving n-bit dynamic range is not equivalent to obtaining n-bit resolution. For example, the sensor of the above-described case could be saturated for the three long integration times for a given light intensity at a pixel, thus only the data with the shortest integration time is used. One way to improve the number of significant digits is to used a higher resolution ADC to have some overlap in conversion range.

Although the present invention has been described in detail with reference to several embodiments, one ordinarily skilled in the art to which this invention pertains will appreciate that various modifications and enhancements may be made in the described embodiments.

For example, the techniques of the embodiments described use readout units of rows and column-parallel readout chains. It should be appreciated that readout units could be other pixel blocks, such as neighboring pixel patches (e.g., 7×7 pixel areas), or any other desired shape. Accordingly, the readout chains can be changed to accommodate the choice of readout units. While the embodiments describe obtaining two integration signals for each pixel being stored, it should be understood that any number, e.g., 3 or 4, integration times could be used. Additional column-parallel signal chains may be added to maintain the frame rate while increasing the number of integration times. Alternatively, the chip design can be maintained at a price of a slower frame rate to increase the number of integration times using the readout method of the present invention.

These and other modifications and enhancements are intended to be encompassed by the following claims.

What is claimed is:

1. An imaging device, comprising:

a substrate formed of a semiconductor material;

an image detector array, having a plurality of pixel circuits formed on said substrate, each pixel circuit generating a pixel signal indicative of a pixel of an image;

a first signal buffer, formed on said substrate and coupled to respectively store pixel signals from a first group of said pixel circuits;

a second signal buffer, formed on said substrate and coupled to respectively store pixel signals from a second group of said pixel circuits, wherein said second group is displaced from said first group by a predetermined number of pixel circuits; and a control circuit coupled to control said image detector array and said first and second signal buffers, said control circuit controlling reading out pixel circuits into said first buffer with a first integration time and controlling reading out pixel circuits into said second buffer with a second integration time different than said first integration time, said first and second buffers storing two different signals with two different integration times for each pixel circuit, wherein said first and second integration times have a difference which depends on said predetermined number of pixel circuits between said first and second groups, wherein said control circuit is adapted to select signals with said first integration time from a first group of pixel circuits and signals with said second integration time from a second group of pixel circuits to form said single frame where said first group of pixel circuits receive less light than said second group of pixel circuits.

2. A device as in claim 1, wherein said control circuit is further adapted to simultaneously read two different groups of pixel circuits that are separated by said predetermined number of pixel circuits into said first and second buffers, respectively.

3. A device as in claim 2, wherein said control circuit is further adapted to vary said predetermined number of pixel circuits between two different groups of pixel circuits, that are being simultaneously and respectively read into said first and second buffers, so as to change said difference between said first and second integration times.

4. A device as in claim 2, further comprising:

a first ADC array of analog-to-digital converters respectively coupled to cells of said first buffer array to produce a first portion of digital bits from signals of said first integration time; and a second ADC array of analog-to-digital converters respectively coupled to cells of said second buffer array to produce a second portion of digital bits from signals of said second integration time, wherein said control circuit is adapted to combine said first and second portion of digital bits from said first and second ADC arrays of analog-to-digital converters for each pixel into a digital output having a higher resolution than resolutions of said analog-to-digital converters in said first and second ADC arrays.

5. A device as in claim 1, further comprising a transistor amplifier in each pixel circuit.

6. A device as in claim 1, further comprising a buffer memory formed on said substrate adapted to store output signals from each pixel circuit that are generated at different times and respectively have said first and second integration times during a frame readout so as to allow a simultaneous readout of said output signals.

7. A device as in claim 6, wherein said buffer memory has a number of memory cells equal to said predetermined number of pixel circuits between said first and second groups.

8. A device as in claim 1, wherein said controlling circuit has means for enabling each pixel circuit to accumulate signals during consecutive readouts by one of said buffer cells in said first and second signal buffer arrays.

9. A device as in claim 1, further comprising a reset gate in each pixel circuit, wherein said control circuit is operable to control said reset gate to delete accumulated signals upon a completion of a sampling by either said first signal buffer array or said second signal buffer array.

10. A device as in claim 1, wherein said control circuit is further adapted to sample each pixel circuit at least three times with said first and second signal buffer arrays to produce said single frame to generate three sets of data with different integration times for each of said pixel circuits, wherein at least one of said first and second signal buffer arrays operates to sample said pixel circuits twice.

11. An imaging device, comprising:
a substrate;
a detector array having a plurality of pixel circuits formed on said substrate to generate signals indicative of an input scene;
a signal buffer array having a plurality of buffer cells formed on said substrate that are coupled to a patch of pixel circuits to store signals from said patch of pixel circuits; and
a control circuit coupled to control said detector array and said signal buffer array to read each pixel circuit within a patch of pixel circuits at least once into said signal buffer array to have a first integration time, and after sequentially reading a predetermined number of patches, to read each pixel circuit within said patch of pixel circuits at least another time into said signal buffer array to have a second integration time to produce a single output frame, hence each pixel circuit producing at least two different output signals with different integration times,
wherein said first and second integration times have a difference which depends on said predetermined number of patches of pixel circuits,
wherein said control circuit is adapted to select signals with said first integration time from a first group of pixel circuits and signals with said second integration time from a second group of pixel circuits to form said single frame where said first group of pixel circuits receive less light than said second group of pixel circuits.

12. A device as in claim 11, wherein said control circuit is further adapted to vary said predetermined number of patches to change said difference between said first and second integration times.

13. A device as in claim 11, further comprising a transistor amplifier in each pixel circuit.

14. A device as in claim 11, further comprising a buffer memory formed on said substrate adapted to store output signals from each pixel circuit that are generated at different times and respectively have said first and second integration times during a frame readout so as to allow a simultaneous readout of said output signals.

15. A device as in claim 14, wherein said buffer memory has a number of memory cells equal to a number of pixel circuits in said predetermined number of patches.

16. A device as in claim 11, further comprising an ADC array of analog-to-digital converters respectively coupled to cells of said buffer array, each analog-to-digital converter operable to produce a first portion of digital bits from a signal of said first integration time of each pixel and to produce a second portion of digital bits from a signal of said second integration time of each pixel,
wherein said control circuit is adapted to combine said first and second portions of digital bits for each pixel into a digital output having a higher resolution than a resolution of said analog-to-digital converters.

17. A method of using an image array of sensing pixels to detect an optical image, comprising:
receiving light from an image using an image array to produce pixel signals; and
sequentially reading out the pixel signals from the image array to produce a single output frame by reading out two units of sensing pixels that are separated by a predetermined amount of sensing pixels to obtain, for each of the sensing pixels, a first integration-time pixel signal and a second integration-time pixel signal that have different integration times depending on said predetermined amount.

18. A method as in claim 17, further comprising combining at least a portion of the first integration-time signals from a first group of pixels obtained in a frame readout and a portion of the second integration-time pixel signals from a second group of pixels from the same frame readout to form an output frame.

19. A method as in claim 17, wherein said pixel circuits are arranged in columns and rows and further comprising:
providing a first signal readout buffer array having buffer cells that are respectively coupled to pixels in each column;
simultaneously reading a first row into said buffer cells of said first readout buffer array to obtain a set of the first integration-time pixel signals;
sequentially scanning said buffer cells in said first readout buffer array and reading out said set of the first integration-time pixel signals;
selecting a second row in said array which is separated from the first row by the predetermined number of rows;
then simultaneously reading said second row into said buffer cells of said first readout buffer array to obtain a set of the second integration-time pixel signals;
then sequentially scanning said buffer cells in said first readout buffer array and reading out said set of the second integration-time pixel signals; and
repeating each of the above reading process for a row next to the first row and another row next to the second row until all rows are read.

20. A method as in claim 17, wherein said pixel circuits are arranged in columns and rows and further comprising:
providing a first signal readout buffer array having buffer cells that are respectively coupled to pixels in each column;

providing a second signal readout buffer array having buffer cells that are respectively coupled to pixels in each column;

simultaneously reading a first column and a second column into said first readout buffer array and said second readout buffer array, respectively, to obtain a set of the first integration-time pixel signals in said first readout buffer array and a set of the second integration-time pixel signals in said second readout buffer array;

then simultaneously scanning said buffer cells in said first and second readout buffer arrays and reading out said set of first integration-time pixel signals and said set of the second integration-time pixel signals, respectively; and repeating the above reading and scanning operations to a row next to the first row and another row next to the second row until all rows are read.

21. A method as in claim 17, further comprising:

producing a first portion of digital bits from a first integration-time pixel signal of a pixel;

producing a second portion of digital bits from a second integration-time pixel signal of the same pixel; and combining the first and second portions of digital bits into a digital output for the same pixel.

22. A method as in claim 17, further comprising depleting a pixel signal in a pixel circuit after reading the pixel circuit to initiate a new integration process.

23. A method as in claim 17, further comprising selecting one of the two different pixel signals from each pixel to form an indicia of the input scene according to an amount of light received by each pixel.

* * * * *